United States Patent
Katou et al.

(10) Patent No.: US 12,531,050 B2
(45) Date of Patent: Jan. 20, 2026

(54) VOICE DATA CREATION DEVICE

(71) Applicant: NTT DOCOMO, INC., Chiyoda-ku (JP)

(72) Inventors: Taku Katou, Chiyoda-ku (JP); Yusuke Nakashima, Chiyoda-ku (JP); Taichi Asami, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 557 days.

(21) Appl. No.: 17/995,518

(22) PCT Filed: Apr. 15, 2021

(86) PCT No.: PCT/JP2021/015637
§ 371 (c)(1),
(2) Date: Oct. 5, 2022

(87) PCT Pub. No.: WO2021/215352
PCT Pub. Date: Oct. 28, 2021

(65) Prior Publication Data
US 2023/0223005 A1    Jul. 13, 2023

(30) Foreign Application Priority Data
Apr. 21, 2020    (JP) ................. 2020-075414

(51) Int. Cl.
*G10L 13/02* (2013.01)
*G10L 15/18* (2013.01)

(52) U.S. Cl.
CPC .............. *G10L 13/02* (2013.01); *G10L 15/18* (2013.01)

(58) Field of Classification Search
CPC .......... G10L 13/02; G10L 15/18; G10L 13/08
See application file for complete search history.

(56) References Cited

U.S. PATENT DOCUMENTS

| | | | |
|---|---|---|---|
| 8,700,396 B1* | 4/2014 | Mengibar | G10L 15/063 704/235 |
| 2013/0218568 A1* | 8/2013 | Tamura | G10L 13/06 704/260 |

(Continued)

FOREIGN PATENT DOCUMENTS

| | | |
|---|---|---|
| JP | 10-274992 A | 10/1998 |
| JP | 2003-29776 A | 1/2003 |

(Continued)

OTHER PUBLICATIONS

International Preliminary Report on Patentability and Written Opinion issued Nov. 3, 2022, in PCT/JP2021/015637 (submitting English translation only), 5 pages.

(Continued)

*Primary Examiner* — Pierre Louis Desir
*Assistant Examiner* — Keisha Y. Castillo-Torres
(74) *Attorney, Agent, or Firm* — Oblon, McClelland, Maier & Neustadt, L.L.P.

(57) ABSTRACT

A voice data creation device is a device configured to create voice data including an additional word which is a word to be added to a recognition target in a speech recognition system, and includes: a sentence example extraction unit configured to extract one or more text corpora including the additional word from a text corpus group including a plurality of text corpora consisting of sentence examples including a plurality of words; a sentence example selection unit configured to select a text corpus having a highest measure indicating a likelihood of occurrence as a sentence among the text corpora extracted by the sentence example extraction unit 11 as an optimal sentence example for the additional word; and a voice creation unit configured to output a synthesized voice of the optimal sentence example (Continued)

generated by a predetermined voice synthesis system as voice data corresponding to the additional word.

8 Claims, 20 Drawing Sheets

(56) References Cited

U.S. PATENT DOCUMENTS

2015/0206539 A1* 7/2015 Campbell ............... G10L 17/22
704/251
2016/0267905 A1* 9/2016 Levit ..................... G10L 15/063

FOREIGN PATENT DOCUMENTS

JP 2012093972 A * 5/2012
JP 2012118720 A * 6/2012

OTHER PUBLICATIONS

International Search Report mailed on Jun. 22, 2021 in PCT/JP2021/015637 filed on Apr. 15, 2021, 3 pages.

* cited by examiner

*Fig.3*

| NOTATION | READING |
|---|---|
| D社 | ディーシャ |
| 千代田区 | チヨダク |
| N社 | エヌシャ |
| ⋮ | ⋮ |

*Fig.4*

| ADDITIONAL WORD | TEXT CORPUS |
|---|---|
| D社 | ["今後はD社で実施していきます。", "本日はD社より紹介いたします。",…] |
| 千代田区 | ["東京都千代田区に所属しております。", "千代田区は東京23区の一つである。",…] |
| ⋮ | ⋮ |

*Fig.5*

| Word | Reading |
|---|---|
| Company D | k vu m p vu n i d i |
| Chiyoda-ku | t_s u i j o uu d au k u |
| Shinjuku-ku | s i n j u k u k u |
| ⋮ | ⋮ |

*Fig.6*

| Word | Text |
|---|---|
| Company D | {"This is the result of research at Company D.", "I am an employee of Company D.",⋯} |
| Chiyoda-ku | {"It is located in Chiyoda-ku, Tokyo.", "Have you ever been to Chiyoda-ku?",⋯} |
| ⋮ | ⋮ |

*Fig.8*

| ADDITIONAL WORD | OPTIMAL SENTENCE EXAMPLE | PERPLEXITY |
|---|---|---|
| D社 | 本日はD社より紹介いたします。 | 120 |
| 千代田区 | 東京都千代田区に所属しております。 | 230 |
| N社 | この商品はN社から発売されます。 | 130 |
| ... | ... | ... |

*Fig.9*

| Word | Text | Perplexity |
|---|---|---|
| Company D | This is the result of research at Company D. | 120 |
| Chiyoda-ku | It is located in Chiyoda-ku, Tokyo. | 230 |
| Company N | He founded Company N. | 130 |
| ... | ... | ... |

*Fig.11*

| NOTATION | CATEGORY |
|---|---|
| D社 | 企業名 |
| 千代田区 | 地名 |
| N社 | 企業名 |
| ⋮ | ⋮ |

Fig.12

| NOTATION | CATEGORY |
|----------|----------|
| D社 | 企業名 |
| 千代田区 | 地名 |
| N社 | 企業名 |
| S社 | 企業名 |
| キーボード | 装置名 |
| K社 | 企業名 |
| マウス | 装置名 |
| 川崎市 | 地名 |
| ⋮ | ⋮ |

Fig.13

| Word | Category |
|---|---|
| Company D | Company |
| Chiyoda-ku | Place |
| Company N | Company |
| ⋮ | ⋮ |

*Fig.14*

| Word | Category |
|---|---|
| Company D | Company |
| Chiyoda-ku | Place |
| Company N | Company |
| Company S | Company |
| mouse | Device |
| Company K | Company |
| keyboard | Device |
| Shinjuku-ku | Place |
| ⋮ | ⋮ |

Fig.15

| ADDITIONAL WORD | CATEGORY | SELECTED SENTENCE EXAMPLE | SENTENCE EXAMPLE TEMPLATE |
|---|---|---|---|
| D社 | 企業名 | 本日はD社より紹介いたします。 | 本日は＜　＞より紹介いたします。 |

Fig. 16

| Word | Category | Text | Template-Text |
|---|---|---|---|
| Company D | Company | This is the result of research at Company D. | This is the result of research at < >. |

Fig. 17

| ADDITIONAL WORD | CATEGORY | OPTIMAL SENTENCE EXAMPLE GENERATED BASED ON SENTENCE EXAMPLE TEMPLATE |
|---|---|---|
| Z社 | 企業名 | 本日はZ社より紹介いたします。 |

Fig. 18

| Word | Category | Text |
|---|---|---|
| Company Z | Company | This is the result of research at Company Z. |

# VOICE DATA CREATION DEVICE

TECHNICAL FIELD

The present invention relates to a voice data creation device.

BACKGROUND ART

In a speech recognition system that recognizes a voice and outputs text, in order to make a certain word a recognition target, voice data corresponding to the word is required. The speech recognition system can recognize the word with a good degree of accuracy by referring to or learning voice data. A technique of creating learning data that can be used for learning in a speech recognition system is known (see, for example, Patent Literature 1). In this technique, utterance data of at least one speaker in a database is used as standard speaker data and the other utterance data is used as learning speaker data to create a conversion function from the standard speaker data space to the learning speaker data space and create learning data by converting data uttered by a standard speaker for a new word into the learning speaker data space using the created conversion function.

CITATION LIST

Patent Literature

[Patent Literature 1] Japanese Unexamined Patent Publication No. H10-274992

SUMMARY OF INVENTION

Technical Problem

Since a voice in which only an additional word to be added to a speech recognition system as a recognition target is uttered does not include information on context, sufficient accuracy of recognition cannot be obtained even when voice data of only words is learned. In addition, in a case where a person generates voice data by generating additional words, the cost and labor are greatly increased.

Consequently, the present invention was contrived in view of the above problems, and an object thereof is to acquire voice data related to an additional word to be added as a recognition target in a speech recognition system, the voice data appropriately including information on the context in which the word appears, at low cost.

Solution to Problem

In order to solve the above problem, according to one aspect of the present invention, there is provided a voice data creation device configured to create voice data including an additional word which is a word to be added to a recognition target in a speech recognition system, the device including: a sentence example extraction unit configured to extract one or more text corpora including the additional word from a text corpus group including a plurality of text corpora consisting of sentence examples including a plurality of words; a sentence example selection unit configured to select a text corpus having a highest measure indicating a likelihood of occurrence as a sentence among the text corpora extracted by the sentence example extraction unit as an optimal sentence example for the additional word; and a voice creation unit configured to output a synthesized voice of the optimal sentence example generated by a predetermined voice synthesis system as voice data corresponding to the additional word.

According to the above aspect, a text corpus that includes an additional word and is likely to occur as a sentence is selected as an optimal sentence example. Therefore, the selected text corpus includes information on the context of the additional word. In addition, since the synthesized voice of the optimal sentence example generated by the voice synthesis system is output as voice data, a cost related to the creation of the voice data is reduced.

Advantageous Effects of Invention

It is possible to realize a voice data creation device capable of acquiring voice data related to an additional word to be added as a recognition target in a speech recognition system, the voice data appropriately including information on the context in which the word appears, at low cost.

BRIEF DESCRIPTION OF DRAWINGS

FIG. 3 is a diagram illustrating an example of an additional word list stored in an additional word storage unit.

FIG. 4 is a diagram illustrating an example of a text corpus including additional words extracted from a text corpus group.

FIG. 5 is a diagram illustrating an English example of an additional word list stored in the additional word storage unit.

FIG. 6 is a diagram illustrating an English example of a text corpus including additional words extracted from the text corpus group.

FIG. 8 is a diagram illustrating an example of an optimal sentence example selected for each additional word.

FIG. 9 is a diagram illustrating an English example of an optimal sentence example selected for each additional word.

FIG. 11 is a diagram illustrating categories associated with additional words.

FIG. 12 is a diagram illustrating an example of a category dictionary stored in a category dictionary storage unit.

FIG. 13 is a diagram illustrating an English example of categories associated with additional words.

FIG. 14 is a diagram illustrating an English example of a category dictionary stored in the category dictionary storage unit.

FIG. 15 is a diagram illustrating an example of a generated sentence example template.

FIG. 16 is a diagram illustrating an English example of a generated sentence example template.

FIG. 17 is a diagram illustrating an example of an optimal sentence example generated on the basis of a sentence example template.

FIG. 18 is a diagram illustrating an English example of an optimal sentence example generated on the basis of a sentence example template.

DESCRIPTION OF EMBODIMENTS

Figure 1:
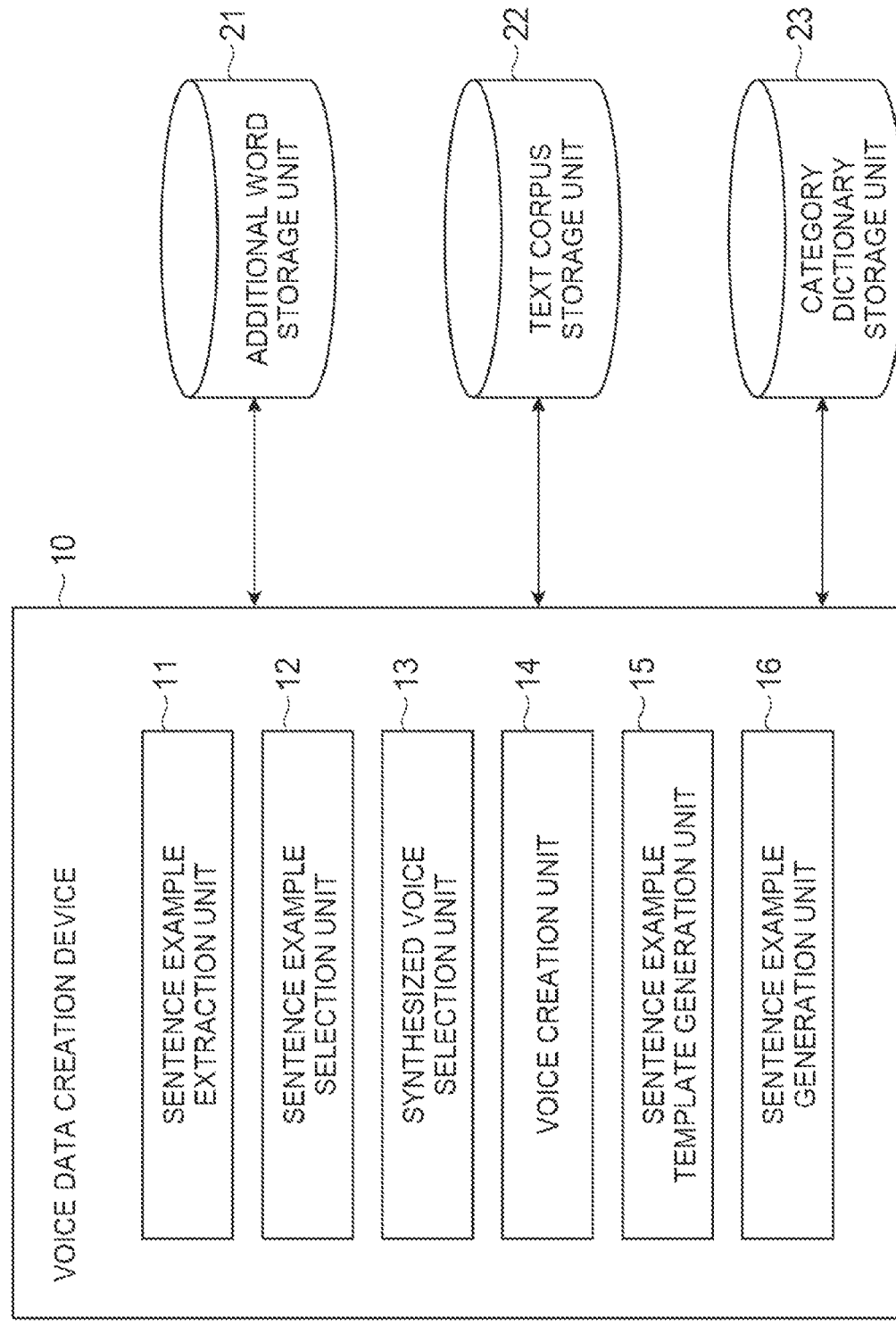
FIG. 1 is a block diagram illustrating a functional configuration of a voice data creation device of the present embodiment.

An embodiment of a voice data creation device according to the present invention will be described with reference to the accompanying drawings. Meanwhile, the same components are denoted, if possible, by the same reference numerals and signs, and thus description thereof will not be repeated.

In a speech recognition system that recognizes a voice and outputs text, in order to make a certain word a recognition target, voice data corresponding to the word is required. A voice data creation device of the present embodiment is a device that creates voice data including additional words which are words to be added to recognition targets in the speech recognition system. The speech recognition system performs speech recognition by using the created voice data for learning or referring to the voice data.

FIG. 1 is a diagram illustrating a functional configuration of a voice data creation device according to the present embodiment. As shown in FIG. 1, a voice data creation device 10 functionally includes a sentence example extraction unit 11, a sentence example selection unit 12, a synthesized voice selection unit 13, a voice creation unit 14, a sentence example template generation unit 15, and a sentence example generation unit 16. Each of these functional units 11 to 16 may be configured by one device, or may be configured to be distributed among a plurality of devices.

In addition, the voice data creation device 10 is configured to be accessible to computer readable recording media such as an additional word storage unit 21, a text corpus storage unit 22, and a category dictionary storage unit 23. The additional word storage unit 21, the text corpus storage unit 22, and the category dictionary storage unit 23 may be configured inside the voice data creation device 10, or may be configured as another device outside the voice data creation device 10 as shown in FIG. 1.

The additional word storage unit 21 is, for example, a storage medium that stores an additional word list including additional words which are words to be added to recognition targets in the speech recognition system. The text corpus storage unit 22 is a storage medium that stores a text corpus group including a plurality of text corpora consisting of sentence examples including a plurality of words. The text corpus group may include an associated corpus group consisting of associated corpora which are text corpora associated with a specific item set in advance. The category dictionary storage unit 23 is a storage medium that stores a category dictionary in which a word and a category to which the word belongs are associated with each other.

Meanwhile, the block diagram shown in FIG. 1 represents blocks in units of functions. These functional blocks (constituent elements) are realized by any combination of at least one of hardware and software. In addition, a method of realizing each functional block is not particularly limited. That is, each functional block may be realized using one device which is physically or logically coupled, or may be realized using two or more devices which are physically or logically separated from each other by connecting the plurality of devices directly or indirectly (for example, using a wired or wireless manner or the like). The functional block may be realized by combining software with the one device or the plurality of devices.

Examples of the functions include determining, deciding, judging, calculating, computing, processing, deriving, investigating, searching, ascertaining, receiving, transmitting, outputting, accessing, resolving, selecting, choosing, establishing, comparing, assuming, expecting, considering, broadcasting, notifying, communicating, forwarding, configuring, reconfiguring, allocating (or mapping), assigning, and the like, but there is no limitation thereto. For example, a functional block (constituent element) for allowing a transmitting function is referred to as a transmitting unit or a transmitter. As described above, realization methods are not particularly limited.

Figure 2:
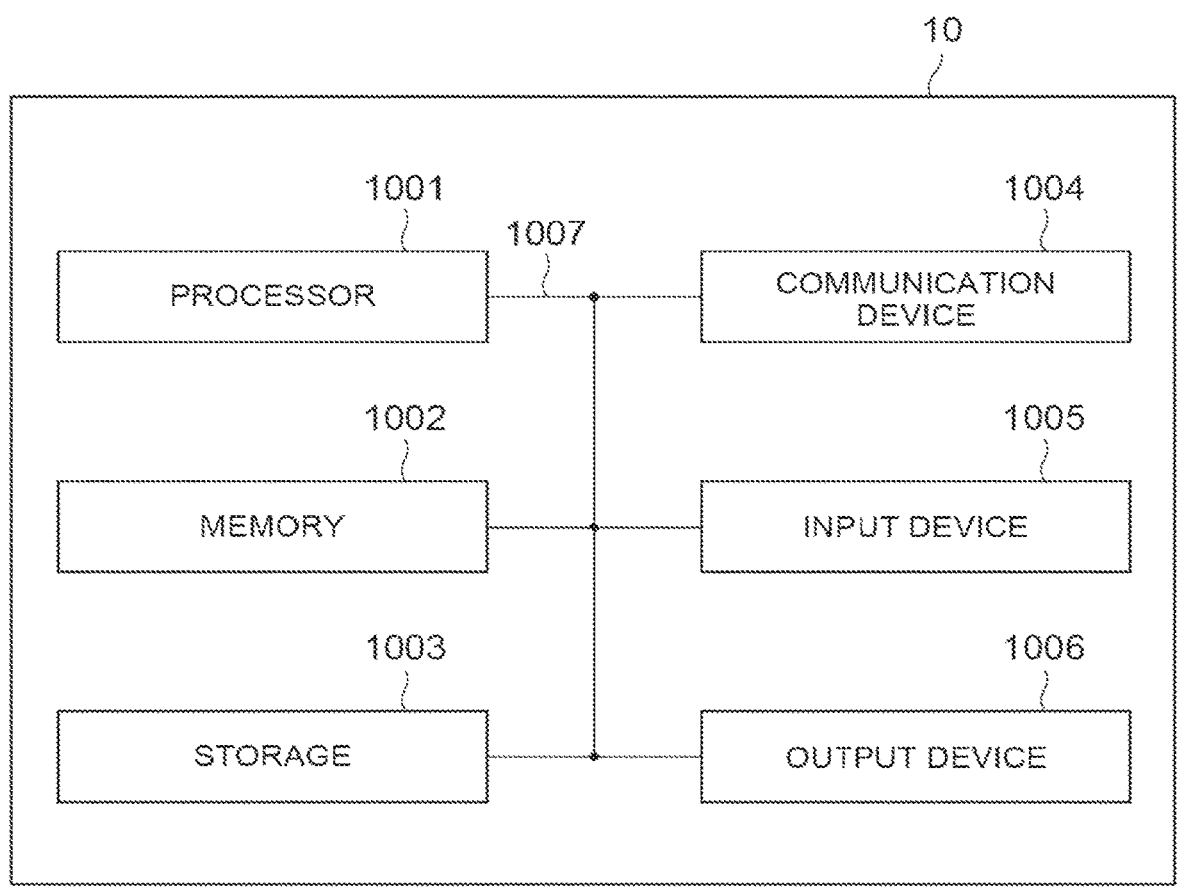
FIG. 2 is a hardware block diagram of the voice data creation device and a determination device.

For example, the voice data creation device 10 in an embodiment of the present invention may function as a computer. FIG. 2 is a diagram illustrating an example of a hardware configuration of the voice data creation device 10 according to the present embodiment. The voice data creation device 10 may be physically configured as a computer device including a processor 1001, a memory 1002, a storage 1003, a communication device 1004, an input device 1005, an output device 1006, a bus 1007, and the like.

Meanwhile, in the following description, the word "device" may be replaced with "circuit," "unit," or the like. The hardware configuration of the voice data creation device 10 may be configured to include one or a plurality of devices shown in FIG. 2, or may be configured without including some of the devices.

The processor 1001 performs an arithmetic operation by reading predetermined software (a program) on hardware such as the processor 1001 or the memory 1002, and thus each function in the voice data creation device 10 is realized by controlling communication in the communication device 1004 and reading and/or writing of data in the memory 1002 and the storage 1003.

The processor 1001 controls the whole computer, for example, by operating an operating system. The processor 1001 may be constituted by a central processing unit (CPU) including an interface with a peripheral device, a control device, an arithmetic operation device, a register, and the like. For example, each of the functional units 11 to 16 and the like shown in FIG. 1 may be realized by the processor 1001. In addition, the processor 1001 reads out a program (program code), a software module and data from the storage 1003 and/or the communication device 1004 into the memory 1002, and executes various types of processes in accordance therewith. An example of the program which is used is a program causing a computer to execute at least some of the operations described in the foregoing embodiment. For example, the voice data creation device 10 and each of the functional units 11 to 16 are stored in the memory 1002, and may be realized by a control program which is operated by the processor 1001. Although the execution of various types of processes by one processor 1001 has been described above, these processes may be simultaneously or sequentially executed by two or more processors 1001. One or more chips may be mounted in the processor 1001. Meanwhile, the program may be transmitted from a network through an electrical communication line.

The memory 1002 is a computer readable recording medium, and may be constituted by at least one of, for example, a read only memory (ROM), an erasable programmable ROM (EPROM), an electrically erasable programmable ROM (EEPROM), a random access memory (RAM), and the like. The memory 1002 may be referred to as a register, a cache, a main memory (main storage device), or the like. The memory 1002 can store a program (program code), a software module, or the like that can be executed in order to carry out a voice data creation method and a determination method according to an embodiment of the present invention.

The storage 1003 is a computer readable recording medium, and may be constituted by at least one of, for example, an optical disc such as a compact disc ROM (CD-ROM), a hard disk drive, a flexible disk, a magneto-optic disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The foregoing storage medium may be, for example, a database including the memory 1002 and/or the storage 1003, a server, or another suitable medium.

The communication device 1004 is hardware (a transmitting and receiving device) for performing communication between computers through a wired and/or wireless network, and is also referred to as, for example, a network device, a network controller, a network card, a communication module, or the like.

The input device 1005 is an input device (such as, for example, a keyboard, a mouse, a microphone, a switch, a button, or a sensor) that receives an input from the outside. The output device 1006 is an output device (such as, for example, a display, a speaker, or an LED lamp) that executes an output to the outside. Meanwhile, the input device 1005 and the output device 1006 may be an integrated component (for example, a touch panel).

In addition, respective devices such as the processor 1001 and the memory 1002 are connected to each other through the bus 1007 for communicating information. The bus 1007 may be constituted by a single bus, or may be constituted by different buses between devices.

In addition, the voice data creation device 10 may be configured to include hardware such as a microprocessor, a digital signal processor (DSP), an application specific integrated circuit (ASIC), a programmable logic device (PLD), or a field programmable gate array (FPGA), or some or all of the respective functional blocks may be realized by the hardware. For example, at least one of these types of hardware may be mounted in the processor 1001.

Next, each functional unit of the voice data creation device 10 will be described. The sentence example extraction unit 11 extracts one or more text corpora including additional words from a text corpus group including a plurality of text corpora consisting of sentence examples including a plurality of words.

In the present embodiment, the sentence example extraction unit 11 acquires additional words from an additional word list stored in the additional word storage unit 21. FIG. 3 is a diagram illustrating an example of an additional word list stored in the additional word storage unit 21. The additional word list contains the notation and reading of additional words in association with each other. As illustrated in FIG. 3, the additional word list includes additional word consisting of notation "D社" and reading "ディーシャ." In addition, the additional word list includes additional words consisting of notation "千代田区" and reading "チヨダク" and additional words consisting of notation "N社" and reading "エヌシャ"

The sentence example extraction unit 11 refers to the text corpus storage unit 22 and extracts a text corpus including additional words from a text corpus group. FIG. 4 is a diagram illustrating an example of a text corpus including additional words extracted from a text corpus group. As shown in FIG. 4, in a case where the additional word "社" is acquired, the sentence example extraction unit 11 extracts a text corpus such as "今後はD社で実施していきます。" and "本日はD社より紹介いたします。" including the notation "D社" from the text corpus group. In addition, in a case where the additional word "千代田区" is acquired, the sentence example extraction unit 11 extracts a text corpus such as "東京都千代田区に所属しております。" and "千代田区は東京23区の一つである。" including the notation "千代田区" from the text corpus group.

Meanwhile, the sentence example extraction unit 11 may extract all of the text corpora including additional words from the text corpora included in the text corpus group. In addition, the sentence example extraction unit 11 may extract a predetermined number of text corpora set in advance including additional word from the text corpora included in the text corpus group.

FIG. 5 is a diagram illustrating an English example of an additional word list stored in the additional word storage unit 21. The additional word list contains notation (Word) and reading (Reading) of additional words in association with each other. As illustrated in FIG. 5, the additional word list includes additional words consisting of Word "Company D" and Reading "k vu m p vu n i d i." In addition, the additional word list includes additional words consisting of Word "Chiyoda-ku" and Reading "t_su i j o uu d au k u" and additional words consisting of Word "Shinjuku-ku" and Reading "s i n j u k u k u."

FIG. 6 is a diagram illustrating an English example of a text corpus including additional words extracted from a text corpus group. As shown in FIG. 6, in a case where the additional word "Company D" is acquired, the sentence example extraction unit 11 extracts a text corpus such as "This is the result of research at Company D." and "I am an employee of Company D." including the notation "Company D" from the text corpus group. In addition, in a case where the additional word "Chiyoda-ku" is acquired, the sentence example extraction unit 11 extracts a text corpus such as "It is located in Chiyoda-ku, Tokyo." and "Have you ever been to Chiyoda-ku?" including the notation "Chiyoda-ku" from the text corpus group.

The sentence example selection unit 12 selects a text corpus having the highest measure indicating the likelihood of occurrence as a sentence, among the text corpora extracted by the sentence example extraction unit 11, as an optimal sentence example for the additional word. Specifically, the sentence example selection unit 12 may calculate the measure of each text corpus extracted by the sentence example extraction unit 11 using a language model. The language model is a probability model that outputs the probability of occurrence of each word on the basis of the arrangement of words in a sentence. The measure of the ease of occurrence as a sentence can be calculated by summing up (adding, integrating, or the like) the probabilities of occurrence of each word included in a sentence.

Various known models may be applied to the language model used in the present embodiment, and an n-gram language model may be used as an example thereof. The n-gram language model is a probability model that calculates the probability of appearance of a word to be calculated on the basis of (n-1) words appearing immediately before the word to be calculated for probability. In the field of speech recognition, a 3-gram language model and a 4-gram language model are often used.

Hereinafter, an example of calculating the probability of occurrence of a sentence "音声認識の紹介です" using a 3-gram language model will be described. In the following description, when P is a probability, <s> is a sentence start symbol, and </s> is a sentence end symbol, the probability of occurrence of the sentence "音声認識の紹介です" is expressed as follows.

P (＜s＞ 音声 認識 の 紹介 です ＜／s＞)

=P (音声｜＜s＞) P (認識｜＜s＞ 音声) P (の｜音声 認識) P (紹介｜認識 の) P (です｜の 紹介) P (＜／s＞|紹介 です)

Meanwhile, any known method may be used for learning the n-gram language model, and methods such as, for example, a maximum likelihood estimation method and linear interpolation may be used.

In addition, the probability of occurrence of an English sentence "Have you ever been to Chiyoda-ku?" using a 3-gram language model is expressed as follows.

P (<s> Have you ever been to Chiyoda-ku?</s>)=
P (Have|<s>) P (you |<s> Have) P (ever | Have you) P (been | you ever)
P (to | ever been) P (Chiyoda-ku | been to) P (? | to Chiyoda-ku)

In this way, a measure indicating the likelihood of occurrence of a text corpus as a sentence is easily calculated by using a language model.

The sentence example selection unit 12 may use a language model to calculate a perplexity indicating the difficulty of each text corpus extracted by the sentence example extraction unit 11 occurring as a sentence and to select a text corpus having the lowest calculated perplexity as an optimal sentence example for the additional word.

The perplexity is a measure indicating the difficulty of a certain sentence being selected on the basis of a language model, and indicates that as the value of the perplexity becomes smaller, the sentence and the language model becomes more compatible. The perplexity of a sentence s based on a language model M is expressed by Expression (1).

[Expression 1]

$$PPL(s|M) = 2^{-\frac{1}{N}\sum_{i=1}^{N} \log P(w_i|M)} \quad (1)$$

M: language model,
s: input sentence with N words,
$w_i$: i-th word in an input sentence s,
$P(w_i|M)$: probability of occurrence of a word $w_i$ in the language model M The sentence example selection unit 12 may select a text corpus having a measure greater than a predetermined threshold and the highest measure as an optimal sentence example. A text corpus having a measure greater than a predetermined threshold is selected as an optimal sentence example, and thus a text corpus containing more than a certain amount of contextual information on additional words can be selected as the optimal sentence example. In addition, when a text corpus of which the measure exceeds a predetermined threshold is not present in the text corpus extracted by the sentence example extraction unit 11, the optimal sentence example is not selected, and thus the quality of voice data is maintained to a certain extent or more.

Meanwhile, in a case where the measure indicating the likelihood of occurrence as a sentence is perplexity, the sentence example selection unit 12 selects a text corpus having a perplexity smaller than a predetermined threshold and the smallest perplexity as the optimal sentence example.

Figure 7:
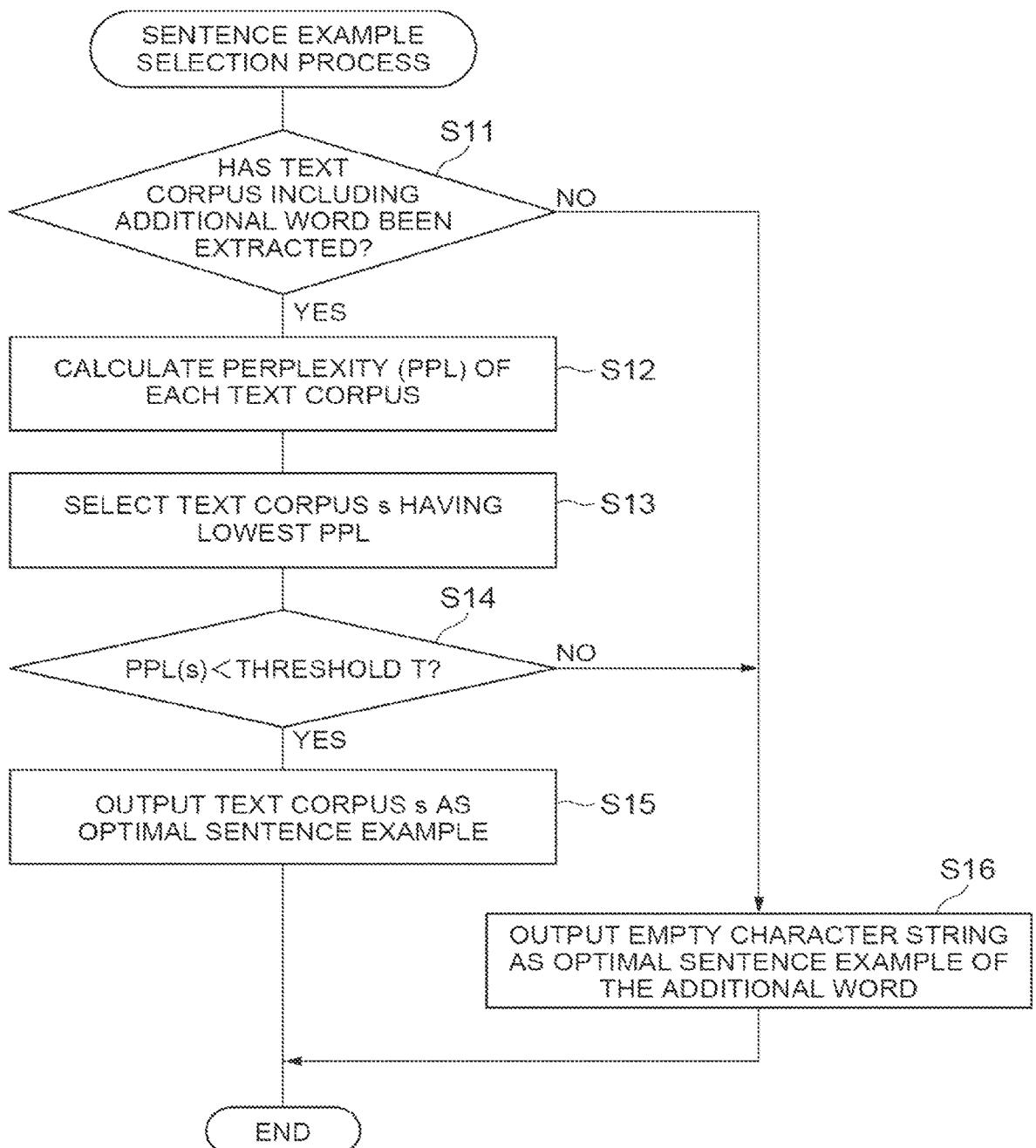
FIG. 7 is a flowchart illustrating processing content of a sentence example selection process of selecting an optimal sentence example.

FIG. 7 is a flowchart illustrating processing content of a sentence example selection process of selecting an optimal sentence example. The flowchart shown in FIG. 7 is a process of selecting an optimal sentence example which is performed for one additional word.

In step S11, the sentence example selection unit 12 determines whether a text corpus including additional words has been extracted by the sentence example extraction unit 11. In a case where it is determined that a text corpus including additional words has been extracted, the process proceeds to step S12. On the other hand, in a case where it is not determined that a text corpus including additional words has been extracted, the process proceeds to step S16.

In step S12, the sentence example selection unit 12 calculates the perplexity (PPL) of each text corpus. In step S13, the sentence example selection unit 12 then selects a text corpus s having the lowest PPL.

In step S14, the sentence example selection unit 12 determines whether the perplexity PPL(s) of the text corpus s is smaller than a predetermined threshold T. In a case where it is determined that PPL(s) is smaller than the predetermined threshold T, the process proceeds to step S15. On the other hand, in a case where it is not determined that PPL(s) is smaller than the predetermined threshold T, the process proceeds to step S16.

In step S15, the sentence example selection unit 12 outputs the text corpus s as the optimal sentence example. On the other hand, in step S16, the sentence example selection unit 12 outputs an empty character string as the optimal sentence example of the additional word.

FIG. 8 is a diagram illustrating an example of an optimal sentence example selected for each additional word. As shown in FIG. 8, the sentence example selection unit 12 outputs an optimal sentence example "本日はD社より紹介いたします。" for an additional word "D社" Meanwhile, the sentence example selection unit 12 may also output the calculated perplexity "120."

In addition, the sentence example selection unit 12 outputs an optimal sentence example "東京都千代田区に所属しております。" for the additional word "千代田区" and the perplexity "230." In addition, the sentence example selection unit 12 outputs an optimal sentence example "この商品は N 社から発売されます。" for the additional word "N 社" and the perplexity "130."

FIG. 9 is a diagram illustrating an English example of an optimal sentence example selected for each additional word. As shown in FIG. 9, the sentence example selection unit 12 outputs an optimal sentence example "This is the result of research at Company D." for the additional word "Company D." Meanwhile, the sentence example selection unit 12 may also output the calculated perplexity "120."

In addition, the sentence example selection unit 12 outputs an optimal sentence example "It is located in Chiyoda-ku, Tokyo." For the additional word "Chiyoda-ku" and the perplexity "230." In addition, the sentence example selection unit 12 outputs an optimal sentence example "He founded Company N." for the additional word "Company N" and the perplexity "130."

In a case where the text corpus group stored in the text corpus storage unit 22 includes an associated corpus group consisting of associated corpora which are text corpora associated with a specific item set in advance, the sentence example extraction unit 11 may extract a text corpus including additional words from at least the associated corpus group in the text corpus group.

That is, the sentence example extraction unit 11 extracts a text corpus from the associated corpus group using a text corpus associated with a field to which the speech recognition system is applied as an associated corpus, and thus it is possible to acquire voice data for constituting a speech recognition system appropriate for the recognition of voice acquired in the field.

For example, in a case where the voice data created by the voice data creation device of the present embodiment is applied to the speech recognition system for recognizing the voice of a certain conference, the associated corpus group may be constituted on the basis of the minutes of past conferences, explanatory materials, and the like.

In addition, in a case where a text corpus is extracted from an associated corpus group associated with a specific item, the sentence example selection unit 12 may select an optimal sentence example using a language model generated (trained) on the basis of associated corpora. By using a language model generated using an associated corpus associated with a field to which the speech recognition system is applied, a text corpus that is likely to occur as a sentence in the field of application can be selected as an optimal sentence example.

The synthesized voice selection unit 13 selects the parameter value of a synthesized voice having the highest accuracy of the result of a predetermined speech recognition process, among synthesized voices generated by each of a plurality of parameter values with respect to at least one or more parameters for generating the synthesized voice, as a parameter value for generating the synthesized voice in the voice synthesis system.

Specifically, the synthesized voice selection unit 13 generates a plurality of synthesized voices for an optimal sentence example selected by the sentence example selection unit 12 with different parameters for generating synthesized voices using the voice synthesis system. For example, in a case where a certain parameter is set by one of continuous values, the synthesized voice selection unit 13 may generate a synthesized voice with a range of values set in advance and each of parameter values of all patterns having a number set in advance. For example, in a case where a certain parameter is set by a continuous value centered on "1.0" and it is set in advance to generate five patterns of synthesized voices having a width of 0.2, the synthesized voice selection unit 13 sets the parameter values of the parameters to "0.6, 0.8, 1.0, 1.2, and 1.4," respectively, and generates five patterns of synthesized voices. Meanwhile, in a case where there are a plurality of parameters to be set, the synthesized voice selection unit 13 generates synthesized voices for all combinations of the setting patterns of the parameters. Meanwhile, the parameters are, for example, speaking speed and a speaker, and are not limited.

The synthesized voice selection unit 13 causes the speech recognition system to recognize the generated synthesized voice of each pattern, compares the optimal sentence example used for the synthesis with the recognition result of each pattern, and calculates the accuracy of recognition of each pattern. The calculation of the accuracy of recognition may be based on any of the accuracy of character recognition, the accuracy of word recognition, and the like. The synthesized voice selection unit 13 selects the pattern of the parameter value having the highest accuracy of recognition as a parameter value for generating a synthesized voice in the voice synthesis system.

The parameter value is selected in this way, and thus voice data consisting of synthesized voices of the optimal sentence example is created by the parameter value that makes it possible to output a synthesized voice easier to recognize in the speech recognition process. Therefore, voice data suitable for learning in the speech recognition system can be obtained.

The voice creation unit 14 outputs the synthesized voice of the optimal sentence example generated by a predetermined voice synthesis system as voice data corresponding to the additional word. The voice synthesis system is a system that receives an input of a character string consisting of text and outputs a voice, and may be configured to include a general algorithm such as, for example, statistical voice synthesis. The parameters of the voice synthesis system are generally a speaker, speaking speed, and the like. In statistical voice synthesis, text is converted into phonemes, parts of speech, and words, and a voice waveform is generated using an acoustic model for voice synthesis.

The additional words illustrated in FIGS. 3 and 5 are each associated with one reading, but the additional words may be associated with a plurality of readings. In such a case, the voice creation unit 14 may generate a synthesized voice of the optimal sentence example using each of all readings of the additional word for each reading. For example, in a case where an optimal sentence example "本日は5Gの紹介です。" is selected by the sentence example selection unit 12 with respect to an additional word "5G" and reading "ファイブジー、ゴジ ―" is associated with the notation "5G" in the additional word list, the voice creation unit 14 generates synthesized voices of text "本日はファイブジーの紹介です" and text "本日はゴジーの紹介です" and outputs the synthesized voices as voice data corresponding to the additional word "5G."

The voice creation unit 14 may output the voice data in any mode, and may, for example, store the voice data in a predetermined storage medium for storing the voice data in association with the voice data additional word.

In addition, the voice creation unit 14 applies the parameter value selected by the synthesized voice selection unit 13 to the voice synthesis system and generates a synthesized voice of the optimal sentence example.

As described above, in a case where a text corpus of which the measure indicating the likelihood of occurrence as a sentence is greater than a predetermined threshold is not present in the text corpus extracted by the sentence example extraction unit 11, the sentence example selection unit 12 may not select the text corpus as the optimal sentence example. In the voice data creation device 10 of the present embodiment, for additional words for which the text corpus as the optimal sentence example has not been selected, a sentence example template consisting of sentence examples with a portion into which the additional word is inserted as a blank may be generated.

Figure 10:
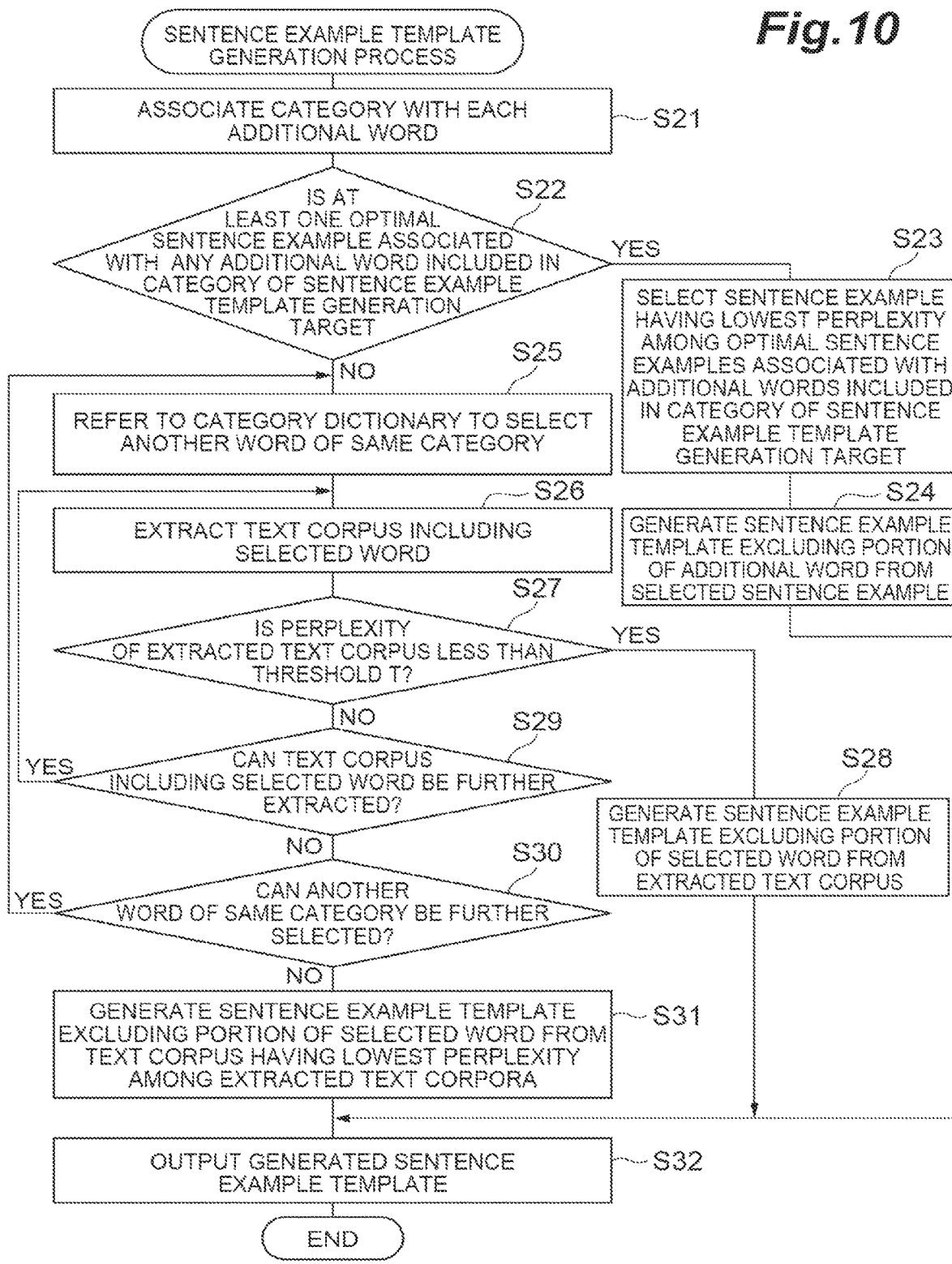
FIG. 10 is a flowchart illustrating processing content of a sentence example template generation process.

The sentence example template generation unit 15 generates a sentence example template for each word category. FIG. 10 is a flowchart illustrating processing content of a process of generating a sentence example template for one category of a sentence example template generation target.

Figure 11:
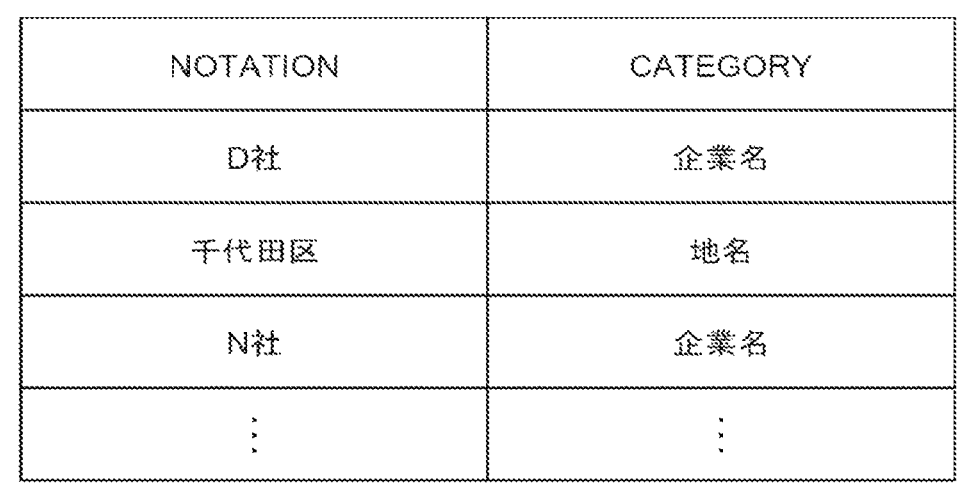

In step S21, the sentence example template generation unit 15 associates a category with each additional word. Meanwhile, the sentence example template generation unit 15 may refer to a category dictionary and associate the category with the additional word. The category dictionary is a dictionary in which words and categories are associated with each other. FIG. 11 is a diagram illustrating an example of additional words with which categories are associated. FIG. 12 is a diagram illustrating an example of a category dictionary stored in the category dictionary storage unit 23.

As shown in FIG. 12, the category dictionary includes words with which each category is associated. The sentence example template generation unit 15 refers to the category dictionary to acquire a category "企業名" of the additional word "D 社" and associate the category "企業名" with the additional word "D 社" as shown in FIG. 11. Similarly, the sentence example template generation unit 15 associates a category "地名" with the additional word "千代田区" and associates a category "企業名" with the additional word "N 社"

Meanwhile, in a case where the additional word is not included in the category dictionary, the sentence example template generation unit 15 may acquire a category that has been input by a user as a category to be associated with the additional word, and may associate the acquired category with the additional word.

FIG. 13 is a diagram illustrating an English example of additional words with which categories are associated. FIG. 14 is a diagram illustrating an English example of a category dictionary stored in the category dictionary storage unit 23. As shown in FIG. 14, the category dictionary includes words with which each category is associated. The sentence example template generation unit 15 refers to the category dictionary to acquire a category "Company" of the additional word "Company D" and associate the category "Company" with the additional word "Company D" as shown in FIG. 13. Similarly, the sentence example template generation unit 15 associates a category "Place" with the additional word "Chiyoda-ku" and associates a category "Company" with the additional word "Company N."

In step S22, the sentence example template generation unit 15 determines whether the sentence example selection unit 12 associates at least one optimal sentence example with any additional word included in a category of a sentence example template generation target. Meanwhile, an example in which the category of a sentence example template generation target is a category "企業名" will be described below. Specifically, the sentence example template generation unit 15 refers to the association of the optimal sentence examples with the additional words illustrated in FIGS. 8 and 9 to determine whether there is an additional word with which the optimal sentence example is associated and of which the category is "企業名" (Company). In a case where it is determined that there is an association of the optimal sentence example, the process proceeds to step S23. On the other hand, in a case where it is not determined that there is an association of the optimal sentence example, the process proceeds to step S25.

In step S23, the sentence example template generation unit 15 selects a sentence example having the lowest perplexity among the optimal sentence examples associated with the additional words included in the category of a sentence example template generation target. In the example shown in FIG. 8, the sentence example template generation unit selects the sentence example "本日はD社より紹介いたします。" having the lowest perplexity among the optimal sentence examples associated with each of the additional words "D 社" and "N 社" of which the category is "企業名"

In addition, in the example shown in FIG. 9, the sentence example template generation unit 15 selects the sentence example "This is the result of research at Company D." having the lowest perplexity among the optimal sentence examples associated with each of the additional words "Company D" and "Company N" of which the category is "Company."

In step S24, the sentence example template generation unit 15 generates a sentence example template with a blank excluding a portion of the additional word from the sentence example selected in step S23. FIG. 15 is a diagram illustrating an example of the generated sentence example template. As shown in FIG. 15, the sentence example template generation unit 15 generates a sentence example template "本日は<>より紹介いたします。" with a blank excluding the portion of the additional word "D 社" from the sentence example "本日はD社より紹介いたします。" selected for the additional word "D 社" of which the category is "企業名."

FIG. 16 is a diagram illustrating an English example of the generated sentence example template. As shown in FIG. 16, the sentence example template generation unit 15 generates a sentence example template "This is the result of research at < >." with a blank excluding the portion of the additional word "Company D" from the sentence example "This is the result of research at Company D." selected for the additional word "Company D" of which the category is "Company."

On the other hand, in a case where there is no association of the optimal sentence example with the additional word of the category of a sentence example template generation target (S22), in step S25, the sentence example template generation unit 15 refers to the category dictionary to select another word of the category of a sentence example template generation target.

In step S26, the sentence example template generation unit 15 extracts a text corpus including the word selected in step S25 from the text corpus group.

In step S27, the sentence example template generation unit 15 determines whether the perplexity of the text corpus extracted in step S26 is less than the predetermined threshold T. In a case where it is determined that the perplexity is less than the threshold T, the process proceeds to step S28. On the other hand, in a case where it is not determined that the perplexity is less than the threshold T, the process proceeds to step S29.

In step S28, the sentence example template generation unit 15 generates a sentence example template with a blank excluding the portion of the word selected in step S25 from the text corpus extracted in step S26.

In step S29, the sentence example template generation unit 15 attempts to further extract the text corpus including the word selected in step S25 from the text corpus group. In a case where the text corpus group can be further extracted, the process returns to step S26, and the sentence example template generation unit 15 extracts the text corpus. On the other hand, in a case where the text corpus group cannot be further extracted, the process proceeds to step S30.

In step S30, the sentence example template generation unit 15 refers to the category dictionary to attempt to further select another word of the same category different from the word selected in step S25. In a case where another word can be further selected, the process returns to step S25, and the sentence example template generation unit 15 selects another word. In a case where another word cannot be further selected, the process proceeds to step S31.

In step S31, the sentence example template generation unit 15 generates a sentence example template with a blank excluding the portion of the word selected in step S25 from the text corpus having the lowest perplexity among the text corpora extracted in step S26.

In step S32, the sentence example template generation unit 15 outputs the sentence example template generated in any of steps S24, S28, and S31. Specifically, the sentence example template generation unit 15 may send out the generated sentence example template to the sentence example generation unit 16. In addition, the sentence example template generation unit 15 may store the generated sentence example template in a predetermined storage medium for storing the sentence example template.

The sentence example generation unit 16 inserts an additional word for which the optimal sentence example has not been selected by the sentence example selection unit 12 into a blank of the sentence example template generated for the category to which the additional word belongs, and generates an optimal sentence example for the additional word. FIG. 17 is a diagram illustrating an example of an optimal sentence example generated on the basis of a sentence example template. In the example shown in FIG. 17, it is assumed that the optimal sentence example is not selected by the sentence example selection unit 12 for an additional word "Z 社" of which the category is "企業名" In such a case, the sentence example generation unit 16 acquires the sentence example template "本日は<>より紹介いたします。" generated for the category "企業名" (see FIG. 15), inserts the additional word "Z 社" into the blank "< >" of the sentence example template, and generates an optimal sentence example "本日は Z 社より紹介いたします。" for the additional word "Z 社."

FIG. 18 is a diagram illustrating an English example of an optimal sentence example generated on the basis of a sentence example template. In the example shown in FIG. 18, it is assumed that the optimal sentence example is not selected by the sentence example selection unit 12 for an additional word "Company Z" of which the category is "Company." In such a case, the sentence example generation unit 16 acquires the sentence example template "This is the result of research at < >." Generated for the category "Company" (see FIG. 16), inserts the additional word "Company Z" into the blank "< >" of the sentence example template, and generates an optimal sentence example "This is the result of research at Company Z." for the additional word "Company Z."

According to the generation of the sentence example template described with reference to FIG. 10, a sentence example template is generated on the basis of the text corpus having the highest measure from the text corpus selected as the optimal sentence example for each additional word belonging to the same category, and thus it is possible to generate a sentence example that is likely to occur as a sentence by inserting another word belonging to the category into a blank. By using the sentence example template generated in this way, it is also possible to generate the optimal sentence example for an additional word for which the optimal sentence example has not been selected.

Figure 19:
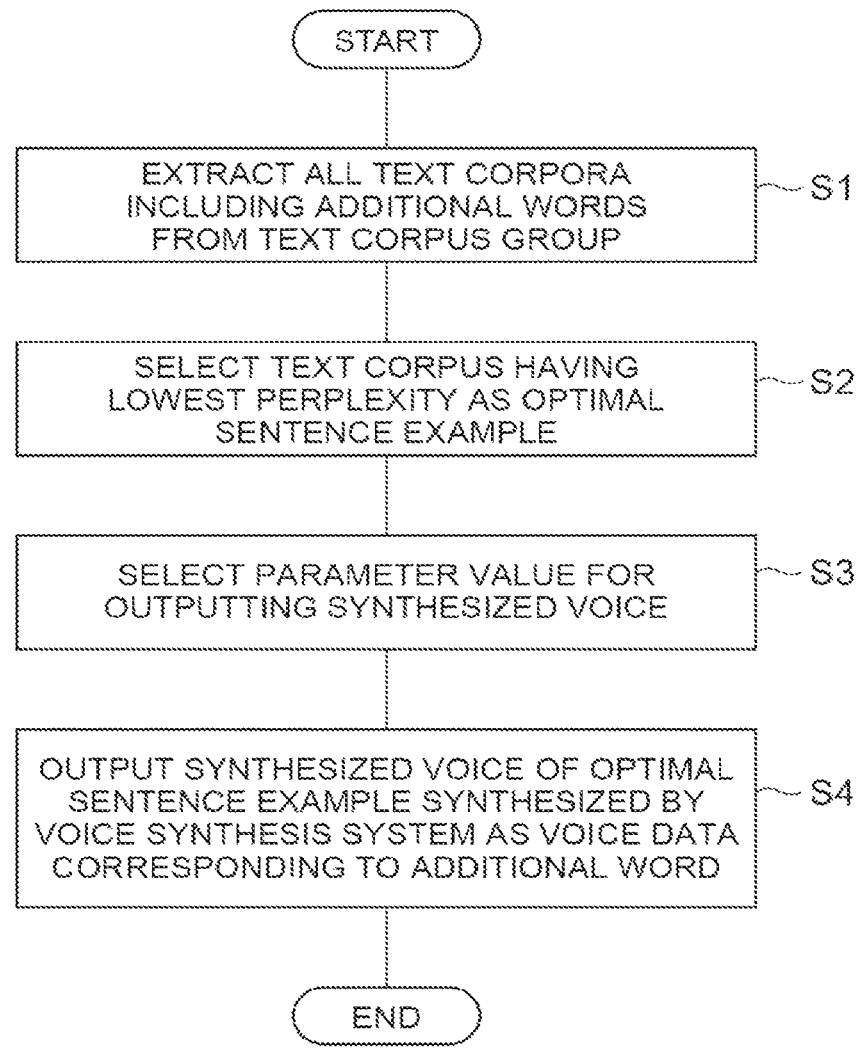
FIG. 19 is a flowchart illustrating processing content of a voice data creation method in the voice data creation device.

FIG. 19 is a flowchart illustrating processing content of a voice data creation method in the voice data creation device 10.

In step S1, the sentence example extraction unit 11 extracts all text corpora including additional words from the text corpus group.

In step S2, the sentence example selection unit 12 selects a text corpus having the highest measure indicating the likelihood of occurrence as a sentence, among the text corpora extracted by the sentence example extraction unit 11, as an optimal sentence example for the additional word. In the present embodiment, the sentence example selection unit 12 selects the text corpus having the lowest perplexity as the optimal sentence example.

In step S3, the synthesized voice selection unit 13 selects a parameter value for outputting a synthesized voice. Meanwhile, the process of step S3 is not essential in the voice data creation method of the present embodiment.

In step S4, the voice creation unit 14 outputs the synthesized voice of the optimal sentence example synthesized by the voice synthesis system as voice data corresponding to the additional word.

Next, reference will be made to FIG. 20 to describe a voice data creation program for causing a computer to function as the voice data creation device 10 of the present embodiment.

A voice data creation program P1 is configured to include a main module m10, a sentence example extraction module m11, a sentence example selection module m12, a synthesized voice selection module m13, a voice creation module m14, a sentence example template generation module m15, and a sentence example generation module m16 that comprehensively control the voice data creation process in the voice data creation device 10. The function of the sentence example extraction unit 11, the sentence example selection unit 12, the synthesized voice selection unit 13, the voice creation unit 14, the sentence example template generation unit 15, and the sentence example generation unit 16 are realized by the modules m11 to m16, respectively.

Figure 20:
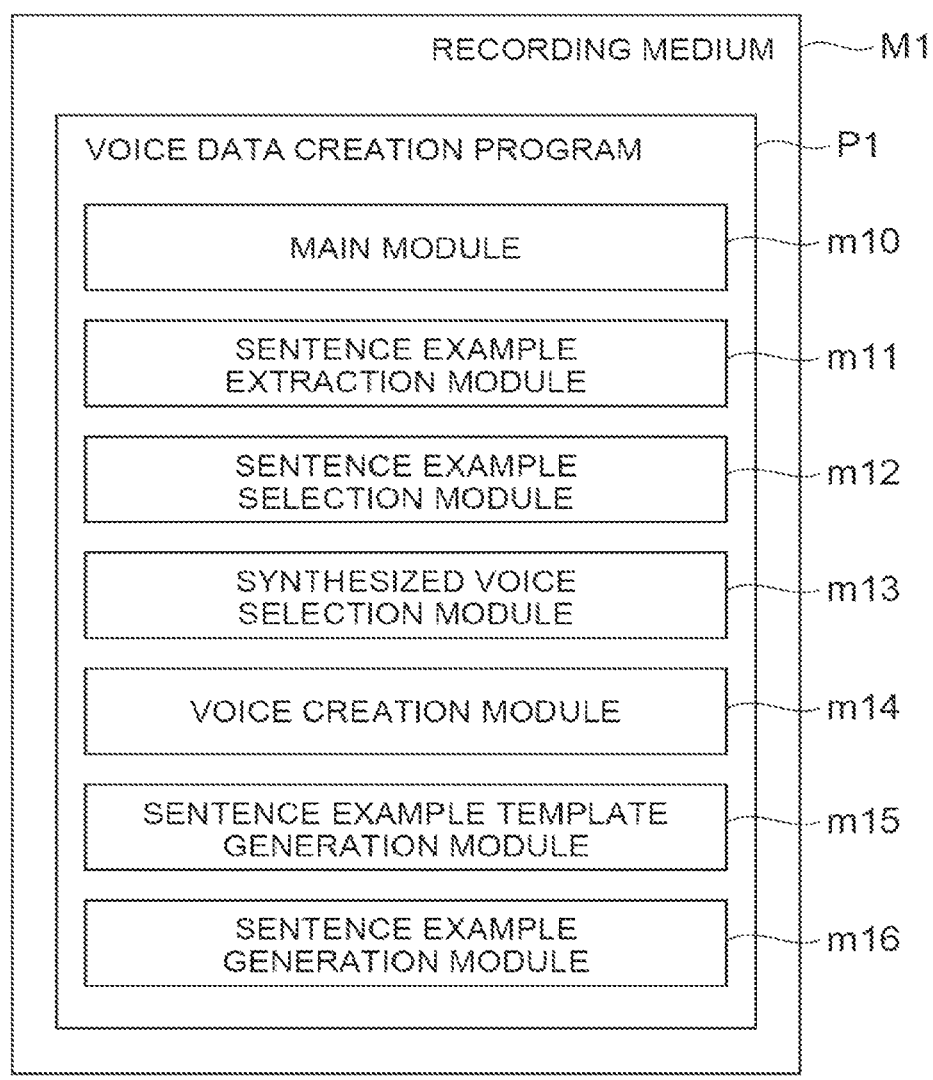
FIG. 20 is a diagram illustrating a configuration of a voice data creation program.

Meanwhile, the voice data creation program P1 may be transmitted through a transmission medium such as a communication line, or may be stored in a recording medium M1 as shown in FIG. 20.

According to the voice data creation device 10, the voice data creation method, and the voice data creation program P1 of the present embodiment described above, a text corpus that includes an additional word and is likely to occur as a sentence is selected as an optimal sentence example. Therefore, the selected text corpus includes information on the context of the additional word. In addition, since the synthesized voice of the optimal sentence example generated by the voice synthesis system is output as voice data, cost related to the creation of the voice data is reduced.

In addition, in the voice data creation device according to another aspect, the sentence example selection unit may calculate the measure of each text corpus extracted by the sentence example extraction unit using a language model that outputs a probability of occurrence of each word on the basis of arrangement of words in a sentence.

According to the above aspect, it is possible to easily calculate a measure indicating the likelihood of occurrence of a text corpus as a sentence.

In addition, in the voice data creation device according to another aspect, the sentence example selection unit may use the language model to calculate a perplexity indicating difficulty of each text corpus extracted by the sentence example extraction unit occurring as a sentence and to select a text corpus having a lowest calculated perplexity as the optimal sentence example for the additional word.

According to the above aspect, a text corpus having the lowest perplexity calculated using a language model is selected as the optimal sentence example. Therefore, a text corpus that includes an additional word and is likely to occur as a sentence is selected.

In addition, in the voice data creation device according to another aspect, the text corpus group may include an associated corpus group consisting of associated corpora which are text corpora associated with a specific item set in advance, the sentence example extraction unit may extract a text corpus including the additional word from at least the associated corpus group in the text corpus group, and the sentence example selection unit may select the optimal sentence example using the language model generated on the basis of the associated corpora.

According to the above aspect, the associated corpus is constituted by, for example, text corpora associated with a field to which the speech recognition system is applied, and thus a text corpus appropriate for the field of application is extracted. In addition, since a language model generated using text corpora associated with the field of application is used, a text corpus that is likely to occur as a sentence in the field of application can be selected as an optimal sentence example.

In addition, the voice data creation device according to another aspect may further include a synthesized voice selection unit configured to select a parameter value of a synthesized voice having a highest accuracy of a result of a speech recognition process performed by the speech recognition system, among synthesized voices generated by each of a plurality of parameter values with respect to at least one or more parameters for generating the synthesized voice, as a parameter value for generating the synthesized voice in the voice synthesis system.

According to the above aspect, voice data consisting of synthesized voices of the optimal sentence example is created by the parameter value that makes it possible to output a synthesized voice easier to recognize in the speech recognition process. Therefore, voice data suitable for learning in the speech recognition system can be obtained.

In addition, in the voice data creation device according to another aspect, the sentence example selection unit may select a text corpus of which the measure is greater than a predetermined threshold and is highest as an optimal sentence example.

According to the above aspect, since a text corpus having a measure greater than a predetermined threshold is selected as an optimal sentence example, a text corpus containing more than a certain amount of contextual information on additional words can be selected as the optimal sentence example. In addition, when a text corpus of which the measure exceeds a predetermined threshold is not present in the extracted text corpus, the optimal sentence example is not selected, and thus the quality of voice data is maintained to a certain extent or more.

In addition, in the voice data creation device according to another aspect, each additional word may be associated with a category to which the word belongs, and the voice data creation device may further include a sentence example template generation unit configured to acquire, among the additional words for which an optimal sentence example is selected by the sentence example selection unit and the text corpora as the optimal sentence example, the additional word and the text corpus having the highest measure of the text corpus selected as an optimal sentence example for each additional word belonging to the same category and to generate a sentence example template with a portion of the additional word as a blank on the basis of the acquired text corpus for each of the categories, and a sentence example generation unit configured to insert the additional word for which the optimal sentence example is not selected by the sentence example selection unit into the blank of the sentence example template generated for a category to which the additional word belongs and to generate the optimal sentence example for the additional word.

According to the above aspect, a sentence example template is generated on the basis of the text corpus having the highest measure from the text corpus selected as the optimal sentence example for each additional word belonging to the same category, and thus it is possible to generate a sentence example that is likely to occur as a sentence by inserting another word belonging to the category into a blank. By using the sentence example template generated in this way, it is also possible to generate the optimal sentence example for an additional word for which the optimal sentence example has not been selected.

In addition, in the voice data creation device according to another aspect, each additional word may be associated with one or more readings of the word, and the voice creation unit may generate a synthesized voice of the optimal sentence example using each of all the readings of the additional word for each of the readings.

According to the above aspect, in a case where a plurality of readings are assumed for the additional word, it is possible to comprehensively generate voice data for all of the plurality of readings.

Hereinbefore, the present embodiments have been described in detail, but it is apparent to those skilled in the art that the present embodiments should not be limited to the embodiments described in this specification. The present embodiments can be implemented as modified and changed aspects without departing from the spirit and scope of the present invention, which are determined by the description of the scope of claims. Therefore, the description of this specification is intended for illustrative explanation only, and does not impose any limited interpretation on the present embodiments.

The aspects/embodiments described in this specification may be applied to systems employing long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra wideband (UWB), Bluetooth (registered trademark), or other appropriate systems and/or next-generation systems to which these systems are extended on the basis thereof.

The processing procedures, the sequences, the flowcharts, and the like of the aspects/embodiments described above in this specification may be changed as long as they are compatible with each other. For example, in the methods described in this specification, various steps as elements are described in an exemplary order but the methods are not limited to the described order.

The input or output information or the like may be stored in a specific location (for example, a memory) or may be managed in a management table. The input or output information or the like may be overwritten, updated, or added. The output information or the like may be deleted. The input information or the like may be transmitted to another device.

Determination may be performed using a value (0 or 1) which is expressed by one bit, may be performed using a Boolean value (true or false), or may be performed by comparison of numerical values (for example, comparison thereof with a predetermined value).

The aspects described in this specification may be used alone, may be used in combination, or may be switched during implementation thereof. In addition, notification of predetermined information (for example, notification of "X") is not limited to explicit transmission, and may be performed by implicit transmission (for example, the notification of the predetermined information is not performed).

Hereinbefore, the present disclosure has been described in detail, but it is apparent to those skilled in the art that the present disclosure should not be limited to the embodiments described in the present disclosure. The present disclosure can be implemented as modified and changed aspects without departing from the spirit and scope of the present disclosure, which are determined by the description of the scope of claims. Therefore, the description of the present disclosure is intended for illustrative explanation only, and does not impose any limited interpretation on the present disclosure.

Regardless of whether it is called software, firmware, middleware, microcode, hardware description language, or another name, software can be widely construed to refer to commands, a command set, codes, code segments, program codes, a program, a sub-program, a software module, an application, a software application, a software package, a routine, a sub-routine, an object, an executable file, an execution thread, an order, a function, or the like.

In addition, Software, a command, and the like may be transmitted and received via a transmission medium. For example, when software is transmitted from a web site, a server, or another remote source using wired technology such as a coaxial cable, an optical fiber cable, a twisted-pair wire, or a digital subscriber line (DSL) and/or wireless technology such as infrared rays, radio waves, or microwaves, the wired technology and/or the wireless technology are included in the definition of a transmission medium.

Information, a signal or the like described in the present disclosure may be expressed using any of various different techniques. For example, data, an instruction, a command, information, a signal, a bit, a symbol, and a chip which can be mentioned in the overall description may be expressed by a voltage, a current, an electromagnetic wave, a magnetic field or magnetic particles, an optical field or photons, or any combination thereof.

Meanwhile, the terms described in this specification and/or the terms required for understanding the present disclosure may be substituted by terms having the same or similar meanings.

The terms "system" and "network" which are used in this specification are used interchangeably.

In addition, information, parameters, and the like described in this specification may be expressed as absolute values, may be expressed by values relative to a predetermined value, or may be expressed by other corresponding information.

The term "determining" which is used in the present disclosure may include various types of operations. The term "determining" may include regarding operations such as, for example, judging, calculating, computing, processing, deriving, investigating, looking up/search/inquiry (for example, looking up in a table, a database or a separate data structure), or ascertaining as an operation such as "determining." In addition, the term "determining" may include regarding operations such as receiving (for example, receiving information), transmitting (for example, transmitting information), input, output, or accessing (for example, accessing data in a memory) as an operation such as "determining." In addition, the term "determining" may include regarding operations such as resolving, selecting, choosing, establishing, or comparing as an operation such as "determining." That is, the term "determining" may include regarding some kind of operation as an operation such as "determining." In addition, the term "determining" may be replaced with the term "assuming," "expecting," "considering," or the like.

An expression "on the basis of" which is used in the present disclosure does not refer to only "on the basis of only," unless otherwise described. In other words, the expression "on the basis of" refers to both "on the basis of only" and "on the basis of at least."

Any reference to elements having names such as "first" and "second" which are used in this specification does not generally limit amounts or an order of the elements. The terms can be conveniently used to distinguish two or more elements in this specification. Accordingly, reference to first and second elements does not mean that only two elements are employed or that the first element has to precede the second element in any form.

Insofar as the terms "include" and "including" and modifications thereof are used in this specification or the claims, these terms are intended to have a comprehensive meaning similarly to the term "comprising." Further, the term "or" which is used in this specification or the claims is intended not to mean an exclusive logical sum.

In this specification, a single device is assumed to include a plurality of devices unless only one device may be present in view of the context or the technique.

In the entire disclosure, a singular form is intended to include a plural form unless the context indicates otherwise.

REFERENCE SIGNS LIST

10 Voice data creation device
11 Sentence example extraction unit
12 Sentence example selection unit
13 Synthesized voice selection unit
14 Voice creation unit
15 Sentence example template generation unit
16 Sentence example generation unit
21 Additional word storage unit
22 Text corpus storage unit
23 Category dictionary storage unit
M1 Recording medium
m10 Main module
m11 Sentence example extraction module
m12 Sentence example selection module
m13 Synthesized voice selection module
m14 Voice creation module
m15 Sentence example template generation module
m16 Sentence example generation module
P1 Voice data creation program.

The invention claimed is:

1. A voice data creation device configured to create voice data including an additional word which is a word to be added to a recognition target in a speech recognition system, the device comprising circuitry configured to:
extract one or more text corpora including the additional word from a text corpus group including a plurality of text corpora consisting of sentence examples including a plurality of words;
select a text corpus having a highest measure indicating a likelihood of occurrence as a sentence among the text corpora extracted by the circuitry as an optimal sentence example for the additional word; and store a synthesized voice of the optimal sentence example generated by a predetermined voice synthesis system as voice data corresponding to the additional word in a predetermined storage medium in association with the additional word, wherein the circuitry selects the text corpus of which the measure is greater than a predetermined threshold and is highest as the optimal sentence example, wherein each additional word is associated with a category to which the additional word belongs, and wherein the circuitry is further configured to:

acquire, among the additional words for which an optimal sentence example is selected by the circuitry and the text corpora as the optimal sentence example, the additional word and the text corpus having the highest measure of the text corpus selected as an optimal sentence example for each additional word belonging to the same category and to generate a sentence example template with a portion of the additional word as a blank on the basis of the acquired text corpus for each of the categories, and insert the additional word for which the optimal sentence example is not selected by the circuitry into the blank of the sentence example template generated for a category to which the additional word belongs and to generate the optimal sentence example for the additional word.

2. The voice data creation device according to claim 1, wherein the circuitry calculates the measure of each text corpus extracted by the circuitry using a language model that outputs a probability of occurrence of each word on the basis of arrangement of words in a sentence.

3. The voice data creation device according to claim 2, wherein the circuitry is configured to use the language model to calculate a perplexity indicating difficulty of each text corpus extracted by the circuitry occurring as a sentence and to select a text corpus having a lowest calculated perplexity as the optimal sentence example for the additional word.

4. The voice data creation device according to claim 2, wherein the text corpus group includes an associated corpus group consisting of associated corpora which are text corpora associated with a specific item set in advance, the circuitry is configured to extract a text corpus including the additional word from at least the associated corpus group in the text corpus group, and the circuitry selects the optimal sentence example using the language model generated on the basis of the associated corpora.

5. The voice data creation device according to claim 1, wherein the circuitry is further configured to select a parameter value of the synthesized voice having a highest accuracy of a result of a speech recognition process performed by the speech recognition system, among synthesized voices generated by each of a plurality of parameter values with respect to at least one or more parameters for generating the synthesized voice, as a parameter value for generating the synthesized voice in the voice synthesis system.

6. The voice data creation device according to claim 1, wherein each additional word is associated with one or more readings of the additional word, and the circuitry generates the synthesized voice of the optimal sentence example using each of all the readings of the additional word for each of the readings.

7. The voice data creation device according to claim 3, wherein the text corpus group includes an associated corpus group consisting of associated corpora which are text corpora associated with a specific item set in advance, the circuitry is configured to extract a text corpus including the additional word from at least the associated corpus group in the text corpus group, and the circuitry selects the optimal sentence example using the language model generated on the basis of the associated corpora.

8. A method, implemented by circuitry of a voice data creation device configured to create voice data including an additional word which is a word to be added to a recognition target in a speech recognition system, the method comprising:

extracting one or more text corpora including the additional word from a text corpus group including a plurality of text corpora consisting of sentence examples including a plurality of words;

selecting a text corpus having a highest measure indicating a likelihood of occurrence as a sentence among the text corpora extracted by the circuitry as an optimal sentence example for the additional word; and storing a synthesized voice of the optimal sentence example generated by a predetermined voice synthesis system as voice data corresponding to the additional word in a predetermined storage medium in association with the additional word, wherein the method includes selecting the text corpus of which the measure is greater than a predetermined threshold and is highest as the optimal sentence example, wherein each additional word is associated with a category to which the additional word belongs, and wherein the method further includes:

acquiring, among the additional words for which an optimal sentence example is selected and the text corpora as the optimal sentence example, the additional word and the text corpus having the highest measure of the text corpus selected as an optimal sentence example for each additional word belonging to the same category and generating a sentence example template with a portion of the additional word as a blank on the basis of the acquired text corpus for each of the categories, and inserting the additional word for which the optimal sentence example is not selected into the blank of the sentence example template generated for a category to which the additional word belongs and to generate the optimal sentence example for the additional word.

* * * * *